(12) United States Patent
Shen

(10) Patent No.: US 11,491,476 B2
(45) Date of Patent: Nov. 8, 2022

(54) REGENERATION METHOD AND DEVICE OF POISONING HONEYCOMB CATALYST

(71) Applicant: Hebei University of Technology, Tianjin (CN)

(72) Inventor: Boxiong Shen, Tianjin (CN)

(73) Assignee: HEBEI UNIVERSITY OF TECHNOLOGY, Tianjin (CN)

( * ) Notice: Subject to any disclaimer, the term of this patent is extended or adjusted under 35 U.S.C. 154(b) by 321 days.

(21) Appl. No.: 16/713,792

(22) Filed: Dec. 13, 2019

(65) Prior Publication Data

US 2021/0008536 A1    Jan. 14, 2021

(30) Foreign Application Priority Data

Jul. 9, 2019    (CN) .......................... 201910613501.X

(51) Int. Cl.

| | | |
|---|---|---|
| *B01J 21/06* | (2006.01) | |
| *B01J 23/22* | (2006.01) | |
| *B01J 23/30* | (2006.01) | |
| *B01J 35/04* | (2006.01) | |
| *B01J 38/02* | (2006.01) | |
| *B01J 38/48* | (2006.01) | |

(52) U.S. Cl.
CPC .............. *B01J 38/48* (2013.01); *B01J 23/30* (2013.01); *B01J 35/04* (2013.01); *B01J 38/02* (2013.01)

(58) Field of Classification Search
CPC . B01J 21/063; B01J 23/22; B01J 23/30; B01J 35/04; B01J 38/02; B01J 38/48
See application file for complete search history.

(56) References Cited

U.S. PATENT DOCUMENTS

| | | | | |
|---|---|---|---|---|
| 6,241,826 B1 * | 6/2001 | Dittmer | .............. | B01D 53/8625 134/1 |
| 6,949,488 B2 * | 9/2005 | Belt | .......................... | B01J 38/10 502/56 |
| 7,943,544 B2 * | 5/2011 | Lee | ........................... | B01J 38/60 502/514 |
| 10,286,393 B2 * | 5/2019 | Park | ......................... | B01J 38/60 |
| 10,300,476 B2 * | 5/2019 | Alvez-Manoli | .......... | C07C 5/415 |
| 10,307,740 B2 * | 6/2019 | Snell | ..................... | B01J 35/0006 |
| 10,363,554 B2 * | 7/2019 | Hong | ....................... | B01J 38/06 |

(Continued)

*Primary Examiner* — Cam N. Nguyen

(74) *Attorney, Agent, or Firm* — Christopher M. Scherer; DeWitt LLP

(57) ABSTRACT

The present invention provides a regeneration method and a regeneration device of a poisoning honeycomb catalyst, and belongs to the field of catalyst regeneration. The regeneration method of the poisoning honeycomb catalyst provided by the present invention includes the following steps: carrying out microwave heating treatment on the poisoning honeycomb catalyst, and then spraying liquid nitrogen into cells of the poisoning honeycomb catalyst so that the poisoning honeycomb catalyst is regenerated. The regeneration method provided by the present invention is simple, and the efficiency of the regenerated catalyst can be increased by 90% more than the original efficiency. According to the regeneration device of a poisoning honeycomb catalyst provided by the present invention, the catalyst regeneration is carried out by using the regeneration device provided by the present invention, the regeneration operation is simple, and the catalytic efficiency of the regenerated catalyst is improved.

7 Claims, 1 Drawing Sheet

(56) References Cited

U.S. PATENT DOCUMENTS

| | | | | |
|---|---|---|---|---|
| 10,549,264 B2* | 2/2020 | Kai | ........................ | B01J 38/485 |
| 10,556,225 B2* | 2/2020 | Snell | ........................ | C07C 5/412 |
| 11,045,799 B2* | 6/2021 | Masuda | ................. | C11D 3/042 |

* cited by examiner

REGENERATION METHOD AND DEVICE OF POISONING HONEYCOMB CATALYST

CROSS-REFERENCE TO RELATED APPLICATIONS

The present application claims priority to Chinese Patent Application No. 201910613501.X, filed Jul. 9, 2019, the content of which is incorporated herein by reference in its entirety.

TECHNICAL FIELD

The present invention relates to the field of catalyst regeneration, in particular to a regeneration method of a poisoning honeycomb catalyst.

BACKGROUND

As a core of SCR denitration technology operation, catalyst activity and life are major concerns in practical application. In the operational process of a denitration system, catalyst poisoning can be caused by flash ash, sulfur dioxide, water vapor, alkali metals (K, Na), alkaline-earth metals (Ca, Mg), phosphorus, lead, arsenic, mercury and the like in flue gas.

The content of ash in flue gas of a coal-fired power plant in our country is between 9% and 24%, particularly for a high-dust arrangement type SCR technology, ash flows through an integral denitration catalyst for long time under the package of flue gas, the ash is easy to deposit on the surface of the catalyst to cause that the surface of the catalyst is covered with dirt, and water vapor is congealed on a low-temperature wall surface under low load so that more ash particles are adhesively aggregated into deposited ash; adhesive $CaSO_4$ is generated by CaO in the ash and $SO_3/SO_2$ in the flue gas so as to easily cause bridging and blockage of loose ash particles; gaseous arsenic trioxide is generated by oxidization when the ignition temperature of arsenic contained in coal is higher than 1400° C., when the flue gas flows through a catalytic reactor, an arsenic compound is congealed on the catalyst along with the flue gas, and an active ingredient is covered with the congealed arsenic compound or capillary openings are blocked by the congealed arsenic compound so as to cause catalyst poisoning. The deposited ash, calcium sulfate and the arsenic compound are adhered to the surface of the catalyst and are unlikely to sweep by an ash ejector, the blockage of the cells of the catalyst can be caused after long-term accumulation, and intake airflow is blocked to cause that the passivation and denitration activity of the catalyst is reduced.

SUMMARY

The present invention provides a regeneration method and device of a poisoning honeycomb catalyst. According to the regeneration method provided by the present invention, the poisoning catalyst can be regenerated, the catalytic performance of the regenerated catalyst is greatly promoted, and the regeneration method provided by the present invention is simple.

The present invention provides the regeneration method of the poisoning honeycomb catalyst, including the following steps:

carrying out microwave heating treatment on the poisoning honeycomb catalyst, and then spraying liquid nitrogen into cells of the poisoning honeycomb catalyst so that the poisoning honeycomb catalyst is regenerated.

Preferably, the microwave heating treatment and liquid nitrogen spraying treatment are carried out repeatedly for 3-5 times.

Preferably, through-cells are formed in the poisoning honeycomb catalyst, and side lengths or diameters of the cells are 3-12 mm.

Preferably, an active ingredient of the poisoning honeycomb catalyst includes $V_2O_5$—$WO_3/TiO_2$.

Preferably, the power of the microwave heating treatment is 600-1200 W; the temperature of microwave heating is 400-480° C.; and the time of microwave heating is 20-50 min.

Preferably, the directions of the cells of the poisoning honeycomb catalyst are parallel to the direction of gravity when the liquid nitrogen is sprayed; and the spraying direction of the liquid nitrogen is parallel to the directions of the cells of the catalyst.

Preferably, the spraying flow of the liquid nitrogen is 120-250 g/h, and the spraying time is 10-30 min.

The present invention also provides a regeneration device of a poisoning honeycomb catalyst, and the regeneration device includes a microwave heater, a liquid nitrogen nozzle, a dust falling opening and a catalyst placing tray; the liquid nitrogen nozzle and the dust falling opening are formed in two ends of the regeneration device; the microwave heater is positioned in the middle areas of the liquid nitrogen nozzle and the dust falling opening; and the catalyst placing tray is positioned at the bottom of the microwave heater.

The regeneration method of the poisoning honeycomb catalyst provided by the present invention includes the following steps: carrying out microwave heating treatment on the poisoning honeycomb catalyst, and then spraying liquid nitrogen into the cells of the poisoning honeycomb catalyst so that the poisoning honeycomb catalyst is regenerated. The regeneration method provided by the present invention is simple, and the efficiency of the regenerated catalyst can be increased by 90% more than the original efficiency.

According to the regeneration device of a poisoning honeycomb catalyst provided by the present invention, the catalyst regeneration is carried out by using the regeneration device provided by the present invention, the regeneration operation is simple, and the catalytic efficiency of the regenerated catalyst is improved.

Where, 1—liquid nitrogen nozzle, 2—microwave heater, 3—catalyst placing tray, 4—dust falling opening, and 5—poisoning honeycomb catalyst.

DETAILED DESCRIPTION

The present invention provides a regeneration method of a poisoning honeycomb catalyst, including the following steps:

carry out microwave heating treatment on the poisoning honeycomb catalyst, and then spray liquid nitrogen into cells of the poisoning honeycomb catalyst so that the poisoning honeycomb catalyst is regenerated.

Figure 1:
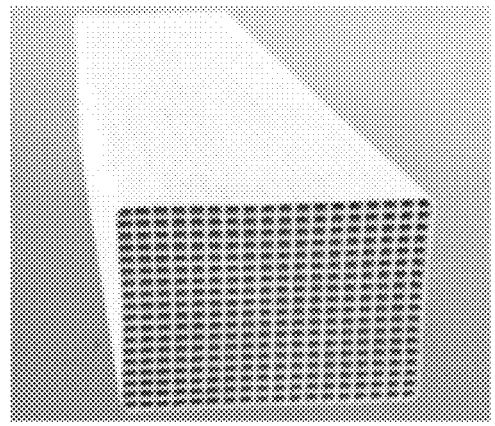
FIG. 1 is a structure diagram of a honeycomb catalyst.

In the present invention, the structure diagram of the poisoning honeycomb catalyst is shown as FIG. 1; preferably, through-cells are formed in the poisoning honeycomb catalyst, the cells can be square, rectangular or circular, and side lengths or diameters of the cells are 3-12 mm, further preferably 5-10 mm, and more preferably 6-9 mm. In the present invention, preferably, an active ingredient of the poisoning honeycomb catalyst includes $V_2O_5$—$WO_3/TiO_2$, which does not exclude that other active ingredients are further added into the poisoning honeycomb catalyst, and the poisoning honeycomb catalyst is preferably a poisoning denitration catalyst. In the present invention, the dimensions of the poisoning honeycomb catalyst are preferably 150 mm 150 mm*600 mm.

In the present invention, microwave heating treatment is carried out on the poisoning honeycomb catalyst. In the present invention, the power of the microwave heating treatment is 600-1200 W, further preferably 800-1000 W; the temperature of microwave heating is 400-480° C., further preferably 420-460° C.; and the time of microwave heating is 20-50 min, further preferably 30-40 min. In the present invention, through microwave heating treatment, the catalyst is heated, then in the subsequent liquid nitrogen spraying process, liquid nitrogen is heated on the surfaces of the cells of the catalyst to form a high-speed airflow, and the deposited ash on the surfaces of the cells of the catalyst can be washed away.

After microwave heating is completed, the liquid nitrogen is sprayed into the cells of the poisoning honeycomb catalyst after microwave heating in the present invention. In the present invention, the directions of the cells of the poisoning honeycomb catalyst are preferably parallel to the direction of gravity; and the spraying direction of the liquid nitrogen is preferably parallel to the directions of the cells of the catalyst. In the present invention, the spraying flow of the liquid nitrogen is 120-250 g/h, further preferably 150-220 g/h, more preferably 180-200 g/h; and the spraying time of the liquid nitrogen is 10-30 min, further preferably 15-25 min. In the present invention, through liquid nitrogen spraying, the liquid nitrogen is heated on the surfaces of the cells of the catalyst to form a high-speed airflow, the surfaces of the cells of the catalyst are washed by the high-speed airflow, the deposited ash in the cells of the catalyst is washed away, and then the purpose that the poisoning honeycomb catalyst is regenerated is reached.

In the present invention, preferably, the microwave heating treatment and liquid nitrogen spraying treatment are carried out repeatedly, so that the poisoning honeycomb catalyst is regenerated. In the present invention, the number of receptions is preferably 3-5, more preferably 4.

Figure 2:
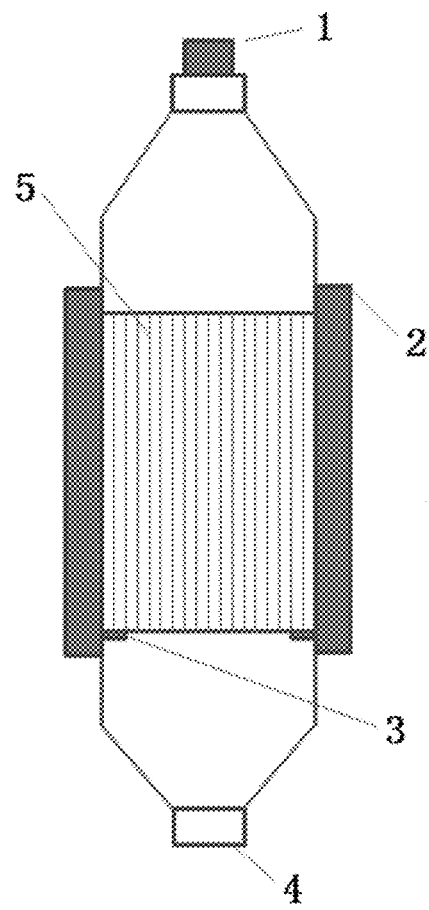
FIG. 2 is a regeneration device of a poisoning honeycomb catalyst.

The present invention also provides a regeneration device of a poisoning honeycomb catalyst, the regeneration device is of a structure shown in FIG. 2, and the regeneration device includes a microwave heater, a liquid nitrogen nozzle, a dust falling opening and a catalyst placing tray; the liquid nitrogen nozzle and the dust falling opening are formed in two ends of the regeneration device; the microwave heater is positioned in the middle areas of the liquid nitrogen nozzle and the dust falling opening; and the catalyst placing tray is positioned at the bottom of the microwave heater. In the present invention, the poisoning honeycomb catalyst is placed on the catalyst placing tray, and the directions of the cells of the poisoning honeycomb catalyst are preferably parallel to the direction of gravity; and the periphery of the poisoning honeycomb catalyst is surrounded by the microwave heater. When in use, firstly, the microwave heater is opened for carrying out microwave heating treatment so that the poisoning honeycomb catalyst is heated, then the microwave heater is closed, the liquid nitrogen nozzle is opened, the liquid nitrogen is heated on the surfaces of the cells of the poisoning honeycomb catalyst to form the high-speed airflow, the deposited ash on the surfaces of the cells of the poisoning honeycomb catalyst are washed, and the purpose of regeneration is reached. After the microwave heating treatment is completed by the regeneration device provided by the invention, and without the need of moving the position of the catalyst, the liquid nitrogen spraying treatment can be carried out directly, so that the regeneration process of the poisoning honeycomb catalyst is easy in operation. In the present invention, there is no special requirement for the overall shape of the regeneration device.

The technical solutions in the present invention will be clearly and completely described below in conjunction with the embodiments of the present invention.

Embodiment 1

The poisoning honeycomb catalyst ($V_2O_5$—$WO_3/TiO_2$, 150 mm*150 mm*600 mm) is vertically placed in the microwave heater (the directions of the cells being parallel to the direction of gravity), the power of the microwave heater is 800 W, the time of microwave heating is 30 min, the temperature of microwave heating is 450° C., and after the microwave heating is completed, the temperature of the poisoning honeycomb catalyst is 450° C.; then, the microwave heater is closed, the liquid nitrogen is sprayed into the through-cells (with the diameters of 8 mm) of the catalyst, the spraying flow of the liquid nitrogen is 150 g/h, and the spraying time is 20 min; the liquid nitrogen is heated on the surfaces of the cells of the catalyst to form the high-speed airflow, the deposited ash on the surfaces of the cells of the catalyst are washed, the processes of microwave heating and liquid nitrogen spraying are carried out repeatedly for 4 times.

Embodiment 2

The poisoning honeycomb catalyst ($V_2O_5$—$WO_3$/$TiO_2$, 150 mm*150 mm*600 mm) is vertically placed in the microwave heater (the directions of the cells being parallel to the direction of gravity), the power of the microwave heater is 600 W, the time of microwave heating is 20 min, the temperature of microwave heating is 400° C., and after the microwave heating is completed, the temperature of the poisoning honeycomb catalyst is 400° C.; then, the microwave heater is closed, the liquid nitrogen is sprayed into the through-cells (with the diameters of 5 mm) of the catalyst, the spraying flow of the liquid nitrogen is 120 g/h, and the spraying time is 10 min; the liquid nitrogen is heated on the surfaces of the cells of the catalyst to form the high-speed airflow, the deposited ash on the surfaces of the cells of the catalyst are washed, the processes of microwave heating and liquid nitrogen spraying are carried out repeatedly for 3 times.

Embodiment 3

The poisoning honeycomb catalyst ($V_2O_5$—$WO_3$/$TiO_2$, 150 mm*150 mm*600 mm) is vertically placed in the microwave heater (the directions of the cells being parallel to the direction of gravity), the power of the microwave heater is 1000 W, the time of microwave heating is 40 min, the temperature of microwave heating is 480° C., and after the microwave heating is completed, the temperature of the poisoning honeycomb catalyst is 480° C.; then, the microwave heater is closed, the liquid nitrogen is sprayed into the through-cells (with the diameters of 12 mm) of the catalyst, the spraying flow of the liquid nitrogen is 250 g/h, and the spraying time is 30 min; the liquid nitrogen is heated on the surfaces of the cells of the catalyst to form the high-speed airflow, the deposited ash on the surfaces of the cells of the catalyst are washed, the processes of microwave heating and liquid nitrogen spraying are carried out repeatedly for 5 times.

The performance of the regenerated catalysts obtained in Embodiment 1 to Embodiment 3 is evaluated. The evaluation method includes the following steps: place the regenerated catalyst in flue gas to carry out a denitration reaction, and test the denitration efficiency of the regenerated catalyst; the conditions of the denitration reaction are as follows: the temperature of the flue gas is 350° C., the initial concentration of NO is 400 ppm, the concentration of NH3 is 400 ppm, the airspeed is 8000/h, and the reaction time is more than 1 hour; the denitration efficiency of the catalyst is tested, in terms of 100% of the denitration efficiency of a non-poisoning fresh honeycomb catalyst, the result is shown as Table 1:

TABLE 1

| | Embodiment 1 poisoning honeycomb catalyst | Embodiment 1 regenerated catalyst | Embodiment 2 poisoning honeycomb catalyst | Embodiment 2 regenerated catalyst | Embodiment 3 poisoning honeycomb catalyst | Embodiment 3 regenerated catalyst |
|---|---|---|---|---|---|---|
| denitration efficiency % | 50% | 90% | 50% | 88% | 50% | 92% | denitration efficiency of different catalysts

From Table 1, it is known that the catalyst can be regenerated according to the method provided by the present invention, and the denitration efficiency of the regenerated catalyst can reach more than 90% of the denitration efficiency of the fresh catalyst available in the market; and moreover, the regeneration method provided by the present invention is simple and easy in operation.

The foregoing descriptions are only preferred implementation manners of the present invention. It should be noted that for a person of ordinary skill in the art, several improvements and modifications may further be made without departing from the principle of the present invention. These improvements and modifications should also be deemed as falling within the protection scope of the present invention.

What is claimed is:

1. A method for regenerating a poisoning honeycomb catalyst, comprising the following steps:
   carrying out microwave heating treatment on the poisoning honeycomb catalyst, and then spraying liquid nitrogen into cells of the poisoning honeycomb catalyst so that the poisoning honeycomb catalyst is regenerated, wherein an active ingredient of the poisoning honeycomb catalyst comprises $V_2O_5$—$WO_3$/$TiO_2$.

2. The method according to claim 1, wherein the microwave heating treatment and liquid nitrogen spraying treatment are carried out repeatedly for 3-5 times.

3. The regeneration method according to claim 1, wherein through-cells are formed in the poisoning honeycomb catalyst, and side lengths or diameters of the cells are 3-12 mm.

4. The method according to claim 1, wherein the power of the microwave heating treatment is 600-1200 W; the temperature of microwave heating is 400-480° C.; and the time of microwave heating is 20-50 min.

5. The method according to claim 1, wherein the directions of the cells of the poisoning honeycomb catalyst are parallel to the direction of gravity when the liquid nitrogen is sprayed; and the spraying direction of the liquid nitrogen is parallel to the directions of the cells of the catalyst.

6. The method according to claim 5, wherein the spraying flow of the liquid nitrogen is 120-250 g/h, and the spraying time is 10-30 min.

7. The method according to claim 1, wherein the spraying flow of the liquid nitrogen is 120-250 g/h, and the spraying time is 10-30 min.

* * * * *